United States Patent
Dewald

(10) Patent No.: US 12,547,009 B2
(45) Date of Patent: Feb. 10, 2026

(54) EFFICIENT USER-DEFINED SDR-TO-HDR CONVERSION WITH MODEL TEMPLATES

(71) Applicant: DOLBY LABORATORIES LICENSING CORPORATION, San Francisco, CA (US)

(72) Inventor: Duane Scott Dewald, Dallas, TX (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 501 days.

(21) Appl. No.: 18/008,039

(22) PCT Filed: Jun. 3, 2021

(86) PCT No.: PCT/US2021/035729
§ 371 (c)(1),
(2) Date: Dec. 2, 2022

(87) PCT Pub. No.: WO2021/247884
PCT Pub. Date: Dec. 9, 2021

(65) Prior Publication Data
US 2023/0229011 A1    Jul. 20, 2023

Related U.S. Application Data

(60) Provisional application No. 63/034,311, filed on Jun. 3, 2020.

(30) Foreign Application Priority Data

Jun. 3, 2020  (EP) ................................. 20178043

(51) Int. Cl.
*G02B 27/09*    (2006.01)
*G02B 13/00*    (2006.01)
(Continued)

(52) U.S. Cl.
CPC ...... *G02B 27/0911* (2013.01); *G02B 13/0095* (2013.01); *G02B 13/16* (2013.01);
(Continued)

(58) Field of Classification Search
CPC .................. G02B 27/0911; G02B 27/0966; G02B 13/08; G02B 13/12; G02B 13/0095; G03B 21/208
See application file for complete search history.

(56) References Cited

U.S. PATENT DOCUMENTS 3,015,988 A    1/1962  Hemstreet
5,930,050 A    7/1999  Dewald
(Continued)

FOREIGN PATENT DOCUMENTS

CN    1831580 A    9/2006
CN    101650514 A    2/2010
(Continued)

*Primary Examiner* — Ryan D Howard

(57) ABSTRACT

Embodiments are disclosed for projection systems with rotatable anamorphic lenses. In an embodiment, an optical projection system comprises: a light source; an optical integrator configured to receive light from the light source and to distribute a uniform pattern of light; a relay lens system including two or more rotatable anamorphic lenses, the anamorphic lenses oriented about an optical axis to transform the uniform pattern of light into an image having a specified aspect ratio; at least one spatial light modulator configured to receive the image and direct a spatially modulated image along an optical path; and at least one projection lens configured to receive the spatially modulated image from the optical path and to project the spatially modulated image onto an image plane with the specified aspect ratio. In a DLP projection system, the relative angle of the two or more rotatable anamorphic lenses is less than 90 degrees to (Continued)

pre-distort the image, resulting in a more rectangular spatially modulated image having the specified aspect ratio.

20 Claims, 8 Drawing Sheets

(51) Int. Cl.
  *G02B 13/16* (2006.01)
  *G02B 27/00* (2006.01)
  *G03B 21/00* (2006.01)
  *G03B 21/20* (2006.01)
(52) U.S. Cl.
  CPC ..... *G02B 27/0068* (2013.01); *G02B 27/0961* (2013.01); *G02B 27/0966* (2013.01); *G02B 27/0994* (2013.01); *G03B 21/008* (2013.01); *G03B 21/208* (2013.01); *G03B 21/2033* (2013.01)

(56) References Cited

U.S. PATENT DOCUMENTS

| 6,457,834 | B1 | 10/2002 | Cotton |
| 7,390,093 | B2 | 6/2008 | Bell |
| 7,654,678 | B1 | 2/2010 | Runco |
| 8,136,947 | B2 | 3/2012 | Phillips, III |
| 8,860,640 | B2 | 10/2014 | Perkins |
| 10,061,111 | B2 | 8/2018 | Hillman |
| 10,066,799 | B2 | 9/2018 | Bhakta |
| 2003/0090635 | A1 | 5/2003 | Cheng |
| 2003/0218725 | A1 | 11/2003 | Cotton |
| 2006/0082888 | A1 | 4/2006 | Huibers |
| 2006/0250579 | A1 | 11/2006 | Silverstein |
| 2008/0259223 | A1 | 10/2008 | Read |
| 2010/0103380 | A1 | 4/2010 | Destain |
| 2017/0227744 | A1 | 8/2017 | Sakata |
| 2018/0284401 | A1 | 10/2018 | Noethen |
| 2018/0313510 | A1 | 11/2018 | Albou |

FOREIGN PATENT DOCUMENTS

| CN | 203054329 | U | 7/2013 |
| GB | 343512 | A | 2/1931 |
| JP | H0630366 | B2 | 4/1994 |
| JP | H06-242396 | A | 9/1994 |
| JP | 2004117931 | A | 4/2004 |
| JP | 2005164824 | A | 6/2005 |
| JP | 2005189847 | A | 7/2005 |
| JP | 2005321502 | A | 11/2005 |
| JP | 2008134432 | A | 6/2008 |
| JP | 2009081610 | A | 4/2009 |
| JP | 2011164450 | A | 8/2011 |
| JP | 2015219434 | A | 12/2015 |
| JP | 2017086653 | A | 5/2017 |
| JP | 2017138490 | A | 8/2017 |

EFFICIENT USER-DEFINED SDR-TO-HDR CONVERSION WITH MODEL TEMPLATES

CROSS-REFERENCE TO RELATED APPLICATIONS

This application claims priority of the following priority applications: U.S. provisional application 63/034,311 (reference: D19051USP1), filed 3 Jun. 2020 and EP application 20178043.4 (reference: D19051EP), filed 3 Jun. 2020, which are hereby incorporated by reference.

TECHNICAL FIELD

This disclosure relates generally to improving optical projection systems.

BACKGROUND

Digital Light Processing (DLP) projection systems are used for digital cinema throughout the world. Digital Cinema Initiatives (DCI) was formed in March 2002 as a joint project of major motion picture studios to develop a system specification for digital cinema. DLP cinema projectors that adhere to DCI use two formats that are related to how the movie is captured and edited. These two formats are "flat" (also known as "academy") at an aspect ratio of 1.85:1, and "cinemascope" (also known as "scope") that can be as wide as 2.66:1 but is normally projected at 2.35:1.

In DLP projector systems, an image is created by a spatial light modulator (SLM), such as microscopically small mirrors arranged in a matrix on a semiconductor chip, known as a digital micro-mirror device (DMD). A DMD is an electromechanical device, whose pixel-generating elements form an array of hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Incident light on the mirror array is reflected by the "on" mirrors in one direction and by the "off" mirrors in the other direction. The pattern of "on" versus "off" mirrors forms an image.

In most applications, the light from the DMD is projected by a projection lens to a screen. In a projection system with a single DLP chip, colors are produced either by placing a color wheel between a white lamp and the DLP chip or by using individual light sources to produce the primary colors. In a DLP projection system with three DLP chips, a prism is used to split light from the lamp, and each primary color of light is routed to its own DMD chip where it is recombined with the other primary colors and routed out through the lens.

In liquid-crystal display (LCD) projection systems, a light source emits a beam of intense white light that is passed through an optical integrator (e.g., a fly's eye integrator) which homogenizes the light. The homogenized light is then passed to dichroic mirrors that are coated with a film that are designed to reflect only a specific wavelength of color, resulting in red, green and blue light beams. Some LCD projectors have a separate LED for each color rather than film-coated dichroic mirrors. The red, green and blue light beams are passed through transmissive LCD panels composed of tiny pixels that either block or allow light to pass when triggered by an electric current. The red, green and blue tinted images output by the LCD panels are recombined in a dichroic prism to form a single image composed of millions of colors. The single image is then projected by a projection lens on a screen.

SUMMARY

The present disclosure relates to projection systems with rotatable anamorphic lenses.

In accordance with an aspect of the present disclosure there is provided a digital light processing, DLP, projection system. The DLP projection system comprises: a light source; a rectangular integrator rod configured to receive light from the light source and to distribute a uniform pattern of light; a relay lens system including two or more rotatable anamorphic lenses, the anamorphic lenses oriented about an optical axis to simultaneously transform the uniform pattern of light into an image having a specified aspect ratio and a relative angle of the anamorphic lenses with respect to each other being less than 90 degrees to pre-distort the image; at least one spatial light modulator configured to receive the pre-distorted image and to direct a spatially modulated image along an optical path; and at least one projection lens configured to receive the spatially modulated image from the optical path and to project the spatially modulated image with the specified aspect ratio onto an image plane.

In accordance with another aspect there is provided a liquid-crystal display, LCD, projection system. The LCD projection system comprises: a light source; a lens array configured to receive light from the light source and to distribute a uniform pattern of light; a relay lens system including two or more rotatable anamorphic lenses, the anamorphic lenses oriented about an optical axis to transform the uniform pattern of light into an image having a specified aspect ratio, wherein the anamorphic lenses have a compression ratio of about 1.13:1; at least one spatial light modulator configured to receive the image and direct a spatially modulated image along an optical path; and at least one projection lens configured to receive the spatially modulated image from the optical path and to project the spatially modulated image with the specified aspect ratio onto an image plane.

The details of the disclosed implementations are set forth in the accompanying drawings and the description below. Other features, objects and advantages are apparent from the description, drawings and claims.

Particular embodiments disclosed herein provide one or more of the following advantages. Illumination aspect ratios in projection systems are changed (e.g., from 2.35 to 1.85 aspect ratio) using two or more rotatable anamorphic lenses. The change in aspect ratio allows only the pixels showing data to be illuminated on the image plane, and thus increases the brightness of the projected image. Additionally, for DLP projection systems the rotatable anamorphic lenses are used to pre-distort the image projected on the DMD chip, resulting in a more rectangular spatially modulated image.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

The same reference symbol used in various drawings indicates like elements.

DETAILED DESCRIPTION

Overview

Since a cinema microdisplay has an aspect ratio of 2048×1080 (or 4096×2160), it does not match the shape of either DCI format, and therefore some pixels are not used. In the case of scope, dozens of rows of pixels on the top and bottom of the microdisplay are not showing any data, yet they remain illuminated by the optics, which currently is optimized to illuminate the whole chip for both formats. In flat projection systems, some columns of pixels are not used, but are illuminated anyway.

A typical projection system utilizes one of two methods for homogenizing light and creating uniform illumination. The first method uses a rectangular integrator rod (solid or hollow). The second method uses lens arrays that are found in most LCD projectors. For the first method, an image of the rectangular integrator rod is projected on the image plane. For DLP projection systems, the DMD surface is illuminated at a 24 degree angle (from the vertical or y-axis where the z-axis is the optical axis) and a 45 degree clocking angle (from horizontal or x-axis) resulting in some distortion of the image of the rectangular integrator rod. Instead of a rectangle, the projected image is a parallelogram when the imaging optic is telecentric in nature.

For DLP and LCD projection systems, an anamorphic telescope is placed in the illumination relay optics of the projection system. The anamorphic telescope "compresses" the image of the rectangular integrator rod by a specified amount. The anamorphic optics magnify the image in one axis but make no change to the image size along an orthogonal axis. By using optical integrator of a specified aspect ratio and compression (e.g., 2.08:1 aspect ratio and a compression of 1.13:1), an image on the SLM surface is created with a desired DCI compliant aspect ratio (e.g., aspect ratio of 2.35:1 or 1.85:1) depending on the orientation of the anamorphic optics (e.g., 2.08×1.13=2.35 and 2.08/1.13=1.85).

For DLP projection systems, if cylindrical, anamorphic lenses are placed at the proper orientation with respect to each other (e.g., less than 90 degrees) in the relay lens system, they will pre-distort the image such that the resulting illumination spot on the DMD surface becomes more rectangular. Therefore, in addition to solving the dual-format projection problem for cinema, the rotatable anamorphic lenses can also be used in specific orientations to rectangularize the shape of the illumination in DLP projection systems. This reduces the magnification necessary to illuminate the DMD surface, and improves efficiency by about 8-10%.

Although the example embodiments disclosed herein are optimized for one color only, a more complex system of optics utilizing various glasses can be used to focus the three primary colors (Red, Green, Blue) onto their respective SLMs simultaneously.

Example Embodiments

Figure 1A:
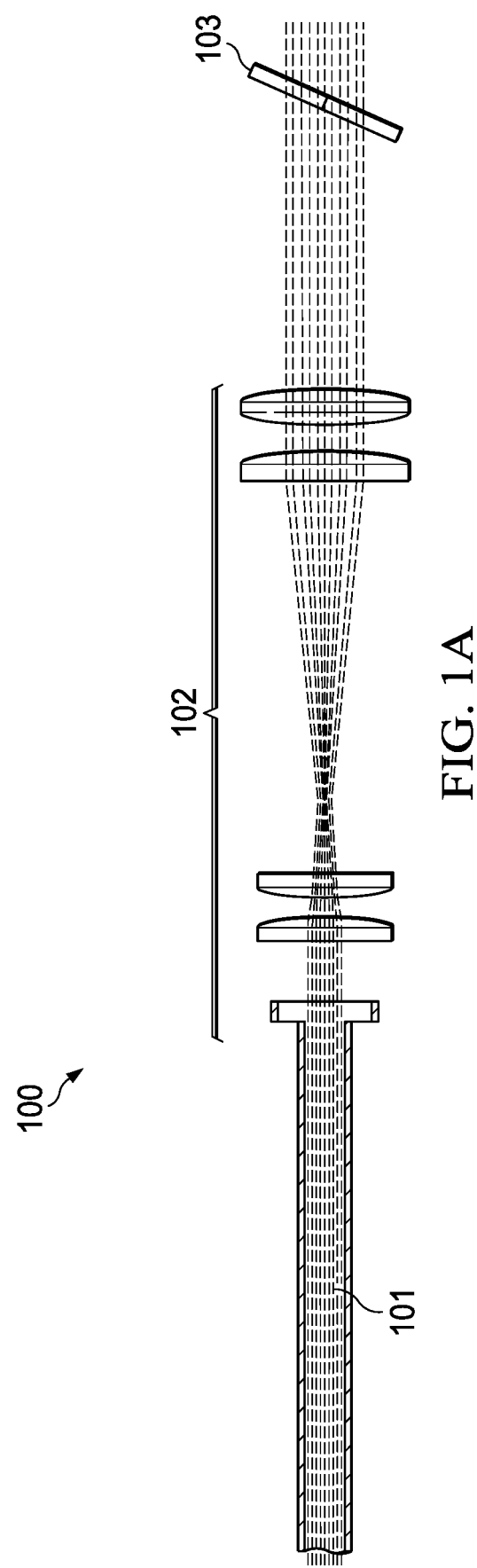
FIG. 1A is a side view of an example illumination system for an optical projection system.

FIG. 1A is an example illumination system 100 for an optical projection system. Illumination system 100 includes optical integrator 101, relay lens system 102 and SLM 103. In an embodiment for DLP projection systems, optical integrator 101 is a rectangular integrator rod. A rectangular integrator rod is a hollow or solid internally reflective "light pipe" which uses multiple reflections of a focused light source to obtain homogenization of round or irregular patterns of illumination and convert them into a uniform rectangular pattern. This pattern is imaged onto SLM 103 (e.g., a DMD chip) by relay lens system 102 and then projected to an image plane (e.g., a theatre screen) by a projection lens (not shown). Rectangular integrator rod 101 is used to improve uniformity and efficiently match the aspect ratio of the illumination source to SLM 103. Relay lens system 102 includes relay optics that are used to position the uniform rectangular pattern onto the SLM 103.

For DLP projection systems, since SLM 103 is illuminated at an angle (from normal) that is typically twice the tilt angle of the micro-mirrors (e.g., 24 degrees for a 12-degree tilt angle device) and a 45 degree clocking angle (from horizontal), there is some distortion in the image on SLM 103. This distortion is typical of rod-based DLP projection systems and reduces efficiency. Relay lens system 200 described in reference to FIGS. 2 and 3 below includes two or more rotatable anamorphic lens to change the aspect ratio of the image projected on SLM 103 (e.g., a DMD chip), and to remove the image distortion, resulting in a substantially rectangular image that utilizes all of the pixels of the aspect ratio. In effect, the anamorphic optics produce a parallelogram-shaped image onto a flat surface, but when this image impinges on SLM 103 at 24 degrees, the parallelogram distortion is canceled. It is desired that the anamorphic ratio (AR) of the cylinder lens group (the ratio of the focal length of the illumination relay parallel and perpendicular to the cylinder axis) satisfies the following conditions: AR>1/cos(θ), where θ is the illumination angle of SLM 103, nominally 24 degrees.

Figure 1B:
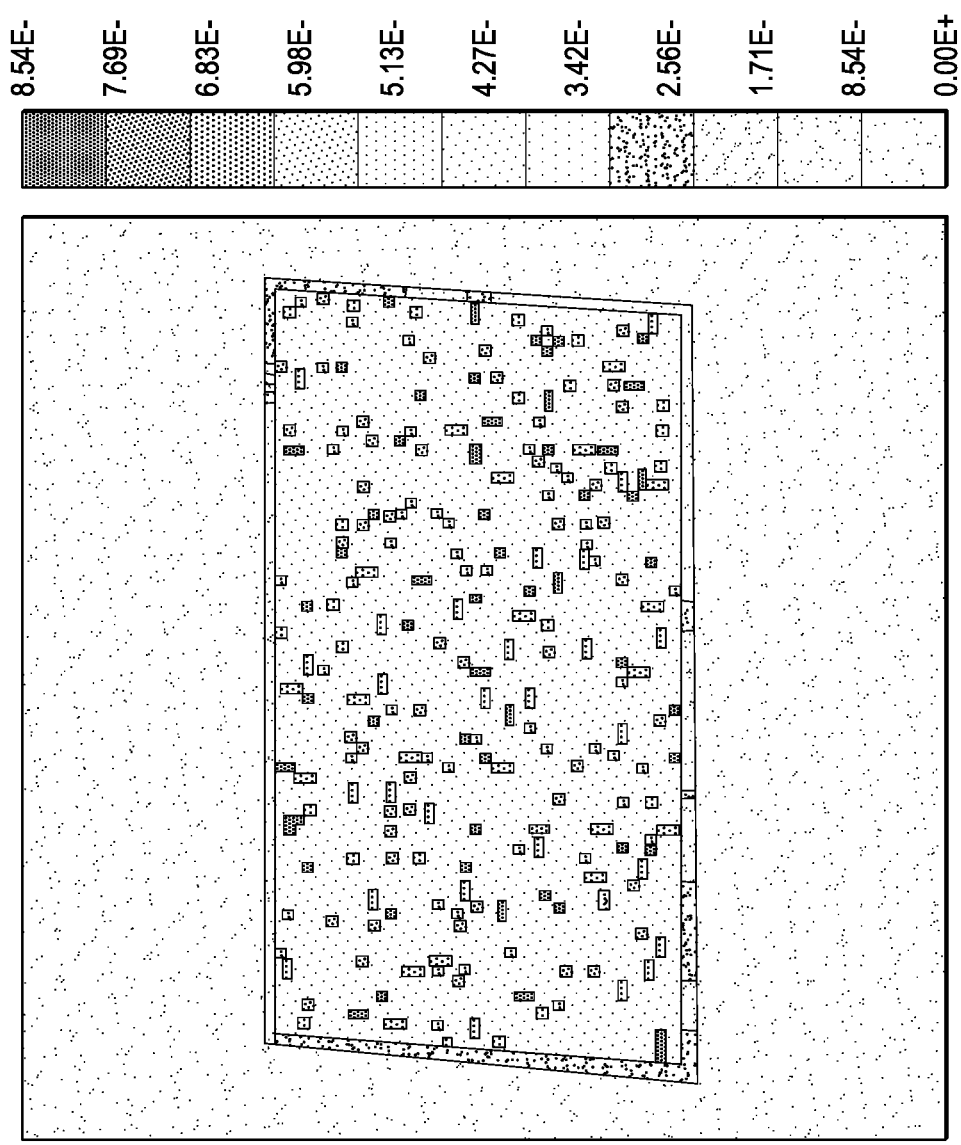
FIG. 1B illustrates a typical illumination area showing a parallelogram image of a rectangular integrator rod projected onto an SLM surface.

FIG. 1B illustrates a typical illumination area showing a parallelogram image of rectangular integrator rod 101 projected onto SLM 103.

Figure 2:
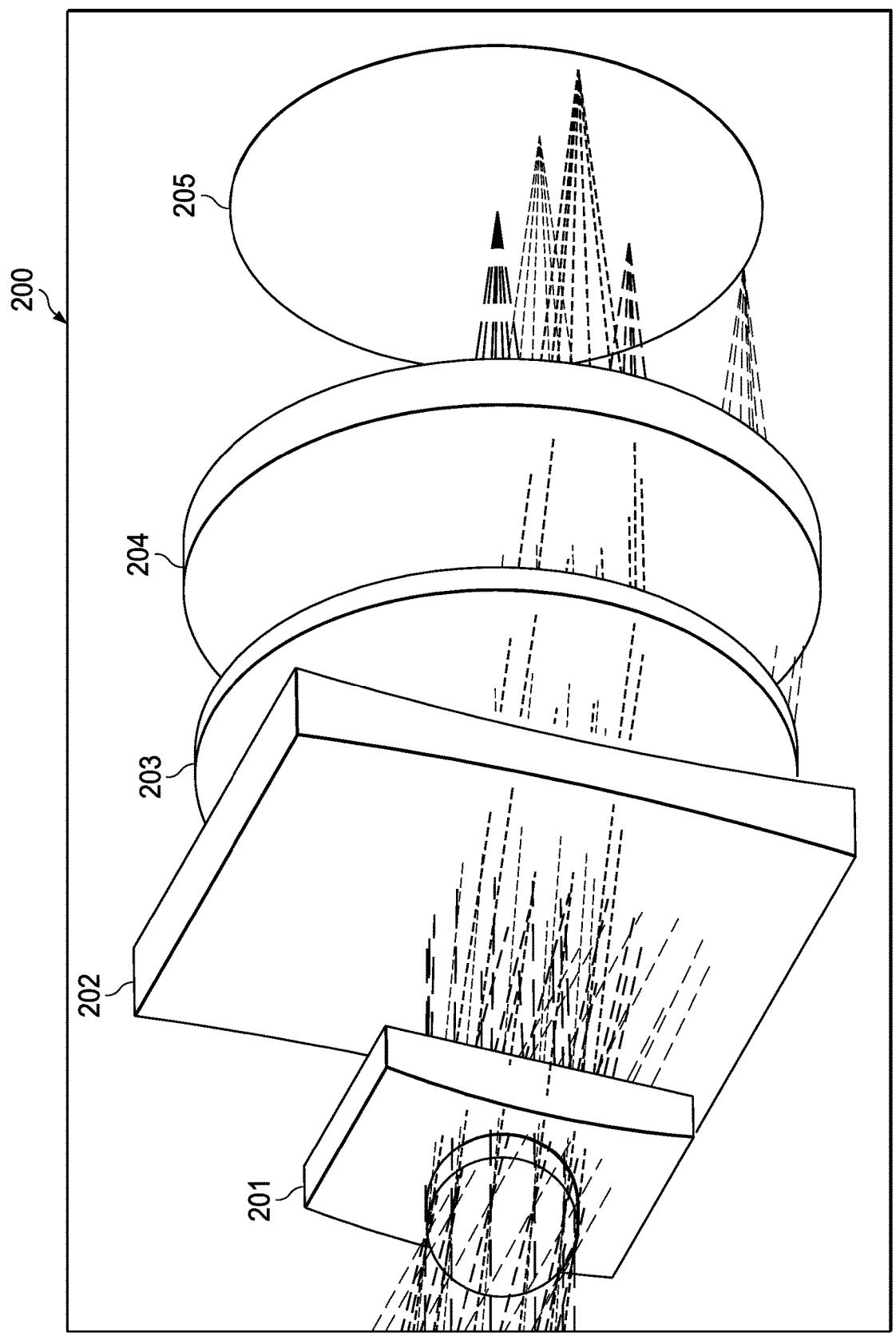
FIG. 2 is a conceptual diagram that illustrates a relay lens system that uses paraxial lenses, showing the orientations of cylindrical optics (rectangular) stretching the image vertically, in accordance with an embodiment.
Figure 3:
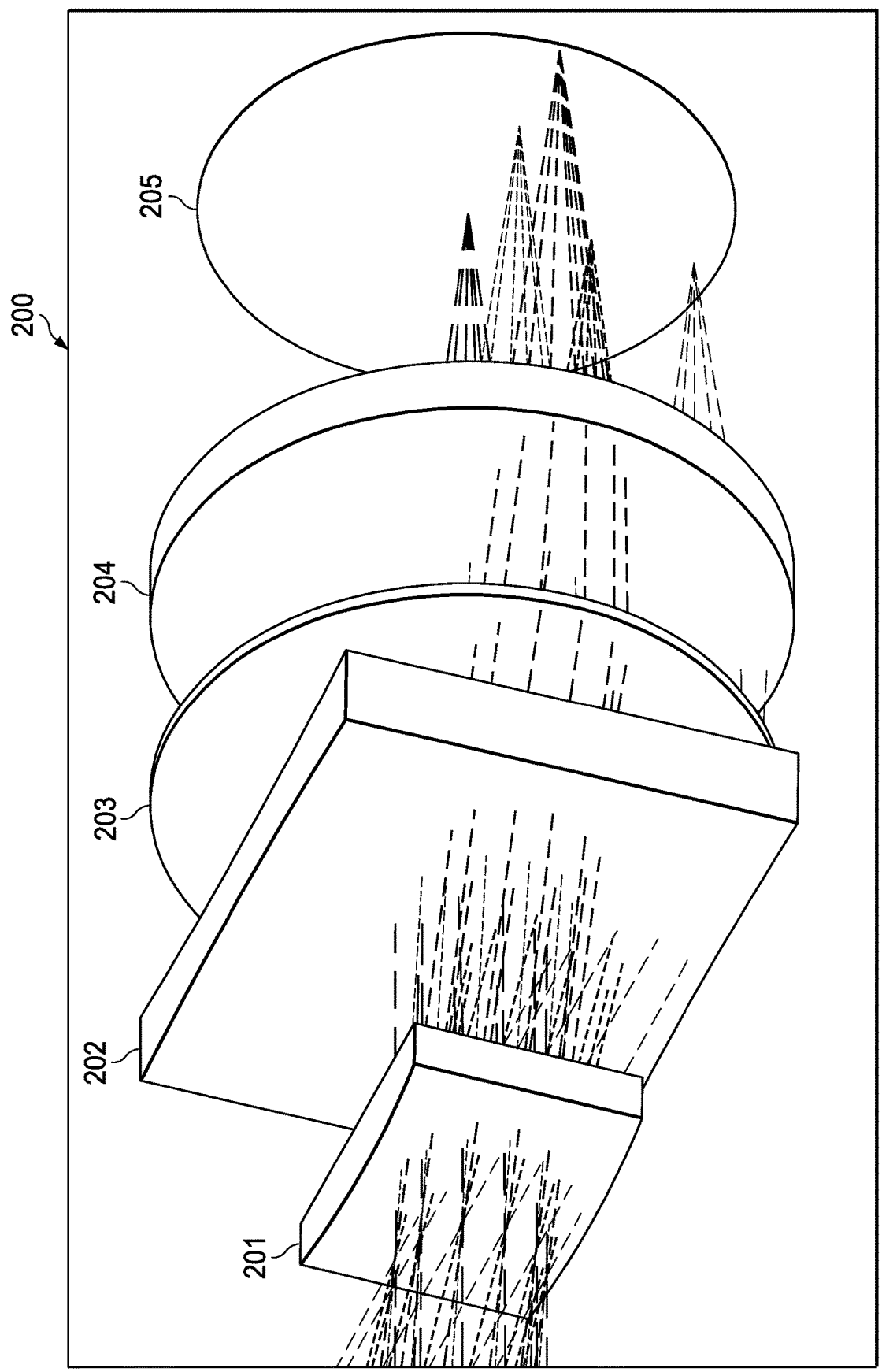
FIG. 3 is a conceptual diagram of the relay lens system of FIG. 2 showing the orientations of the cylindrical optics (rectangular) stretching the image horizontally, according to an embodiment.

FIG. 2 illustrates a relay lens system 200 that uses paraxial lenses, showing the orientations of the cylindrical optics (rectangular) stretching the image vertically, in accordance with an embodiment. FIG. 3 illustrates the relay lens system of FIG. 2, showing the orientations of the cylindrical optics (rectangular) stretching the image horizontally, according to an embodiment.

The exemplary relay lens system 200 shown in FIGS. 2 and 3 includes rotatable, anamorphic lens 201, 202 (forming an "anamorphic telescope"), spherical illumination lenses 203, 204 and SLM 205. The lines shown penetrating the optics in FIG. 2 represent light rays from a light source (not shown). The light source can be any coherent light source, such as white lite, high-power Light Emitting Diodes (LEDs) or lasers.

In an embodiment, spherical illumination lenses 203, 204 project an image of the rectangular integrator rod (not shown) without affecting its aspect ratio. Anamorphic lenses 201, 202, on the other hand, project a version of the image of the rectangular integrator rod that is compressed along the longer dimension (usually by a factor of two). In the embodiment shown, anamorphic lens 201, 202 are cylindrical lens with any desired surface type, including but not limited to: convex, concave, bi-concave or a combination of convex and concave surfaces ("meniscus" surface type). In an embodiment, doublet elements can be used to reduce light loss and increase the contrast ratio of the displayed image.

The extent to which anamorphic lens 201, 202, modify the aspect of the image they receive (herein referred to as its "aspect modification ratio") is determined by a number of factors. These include the radius, thickness, and type of glass of each element of the lens. Thus, the same configuration of anamorphic lenses 201, 202 could be modified to have a different optical prescription thereby providing other modification ratios. Anamorphic lenses 201, 202 can be any desired size, so long as the size is sufficient to capture all or most of the light rays from the light source. For example, anamorphic lens 201 can be the same size or a different size than anamorphic lens 202.

As previously described, the orientation of anamorphic lenses 201, 202 shown in FIG. 2 will "stretch" the image vertically, and the orientation of anamorphic lenses 201, 202 shown in FIG. 3 will "stretch" the image horizontally. Note that the orientations of anamorphic lenses 201, 202 shown in FIG. 3 are rotated by 90 degrees about the optical axis from their orientations shown in FIG. 2. In an embodiment, in which a rectangular integrator rod has an aspect ratio of 2.08:1, and anamorphic lenses 201, 202 provide a compression of 1.13:1, the image projected onto image plane 205 will have a DCI compliant aspect ratio of 2.35:1 or 1.85:1 (as 2.08×1.13=2.35 and 2.08/1.13=1.85). Thus, by stretching the image projected onto image plane 205 the illumination of the projection system is changed to allow only pixels showing data to be illuminated, and the brightness of the projected image is increased up to 20%. In practice, the rectangular integrator rod 101 is not exactly the same aspect ratio as the desired illumination spot in the case of DLP illumination, as the image is stretched by impinging on the DMD plane at an oblique angle. In the case of LCD projection, where the illumination is normal to the LCD modulator panel, the aspect ratio of the integrator more closely matches the desired illumination shape.

Figure 6:
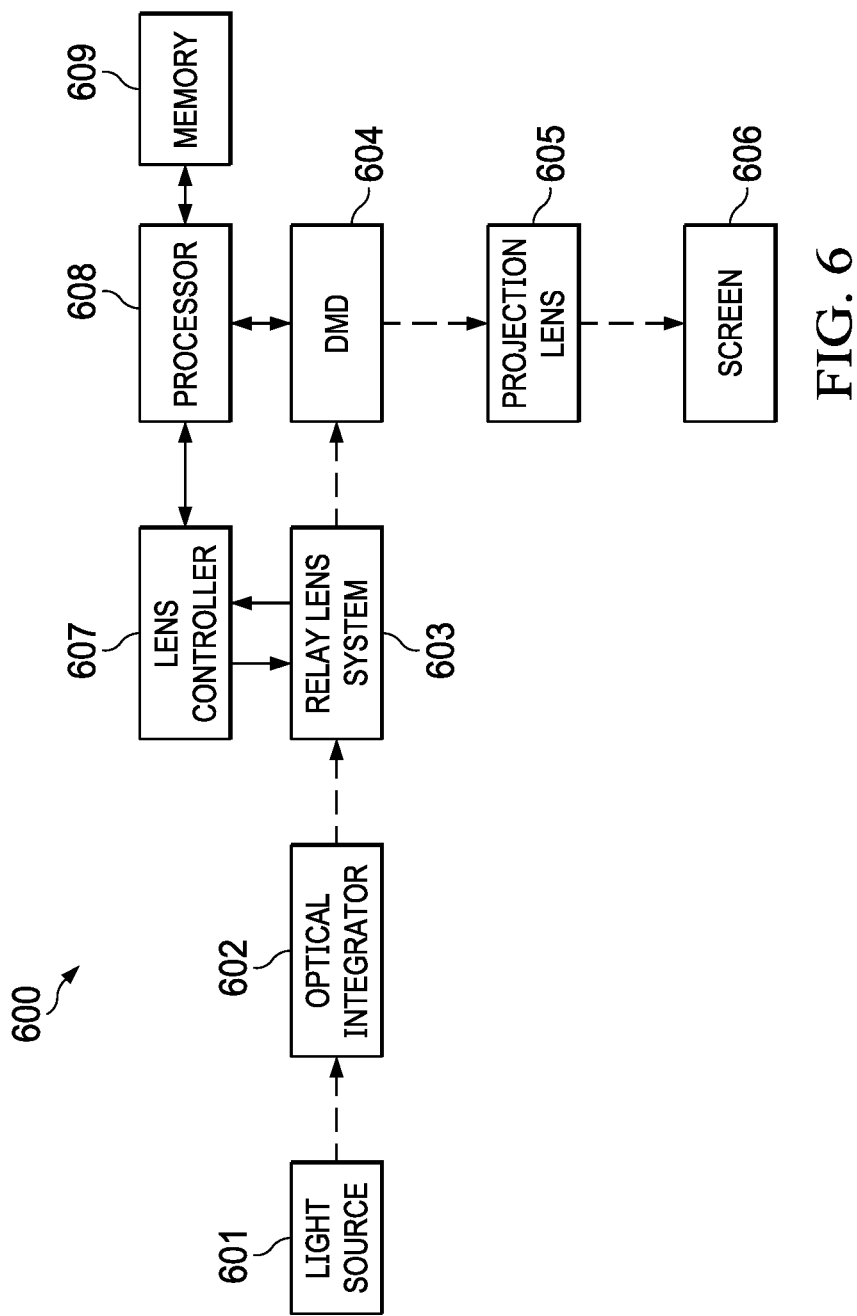
FIG. 6 is a conceptual block diagram of a DLP projection system that uses a relay lens system with rotatable anamorphic lenses, according to an embodiment.

In an embodiment, anamorphic lenses 201, 202 are mounted in a lens barrel with bearings or other mechanical devices that facilitate rotation of anamorphic lenses 201, 202 about the optical axis, allowing lenses 201, 202 to be rotated manually or automatically using a suitable control system, as described in reference to FIG. 6. For example, anamorphic lenses 201, 202 can be rotated 90 degrees about the optical axis each time the DCI format needs to be changed. In an embodiment, the anamorphic lenses 201, 202 are mounted on a lens turret mounted on a projector that can be manually or automatically rotated to orientate the lenses about an optical axis. A used herein, an "optical axis" is an imaginary line that defines the path along which light propagates through the projection system, up to a first approximation. As used herein, an "optical path" is the path that light takes in travelling an optical medium or system.

In DLP projection systems, if anamorphic lenses 201, 202 are placed at certain orientations in relay lens system 200, anamorphic lenses 201, 202 can be used to pre-distort the image projected onto SLM 205, such that the image becomes more rectangular.

Figure 4:
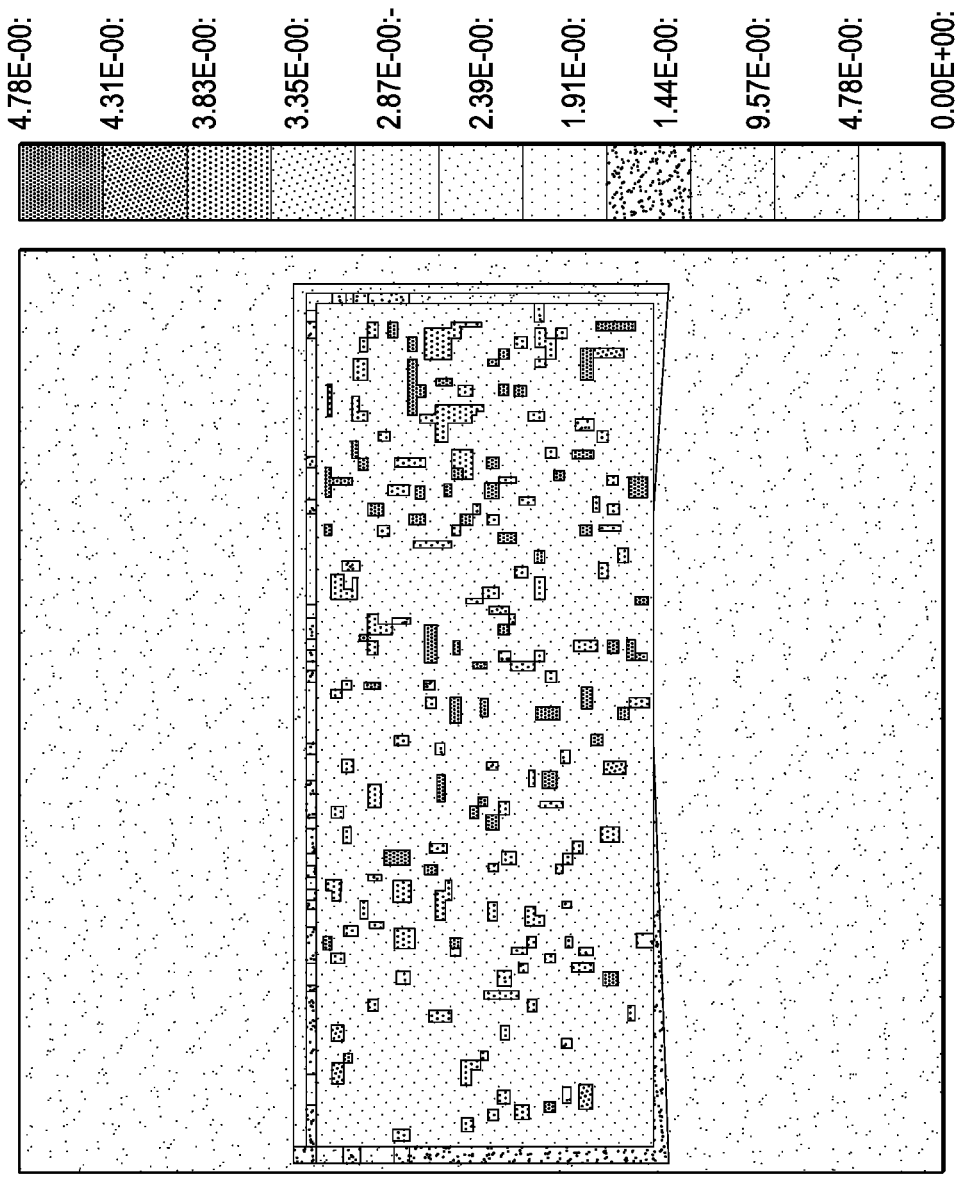
FIG. 4 illustrates a rectangular illumination spot with cylinder lenses rotated to a first position to reduce distortion, according to an embodiment.
Figure 5:
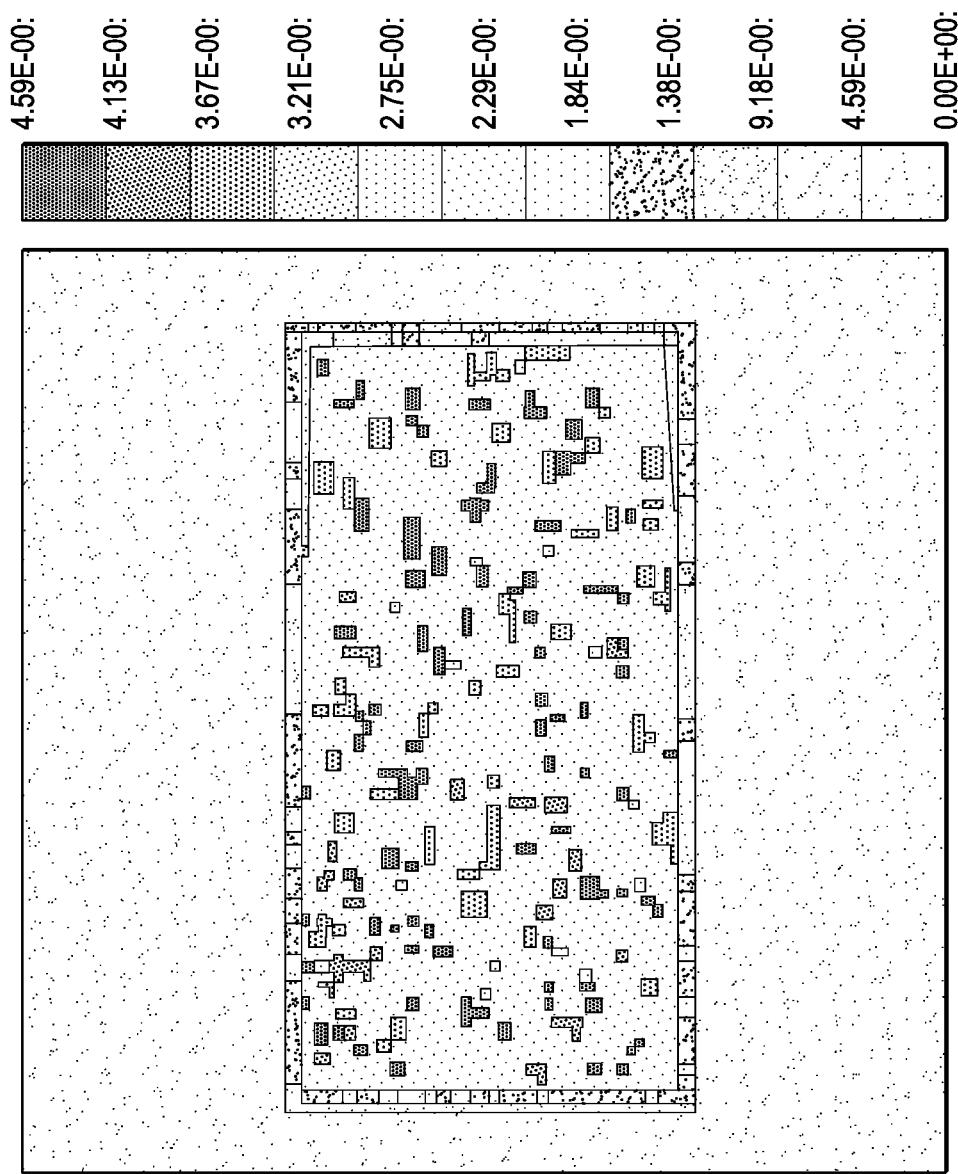
FIG. 5 illustrates a rectangular illumination spot with cylinder lenses rotated to a second position to reduce distortion, according to an embodiment.

FIG. 4 illustrates a rectangular illumination spot with cylindrical, anamorphic lenses 201, 202 rotated to a first position, according to an embodiment. FIG. 5 illustrates a rectangular illumination spot with cylindrical anamorphic lenses 201, 202 rotated to a second position, according to an embodiment. The first and second positions can be determined empirically using computer-based modeling and simulation for the particular application and projection system illumination optics.

Therefore, in addition to solving the dual-format projection problem for cinema, the addition of rotatable anamorphic lenses 201, 202 that are rotated in specific relative orientations to each other (e.g., less than 90 degrees), results in a more rectangular shape of the illuminated image in DLP projection systems. The more rectangular image reduces the magnification necessary to illuminate the DMD chip, and improves efficiency by about 8-10%.

Although the example embodiments disclosed herein are optimized for one color only, a more complex system of optics utilizing various glasses can be used to focus the three primary colors (Red, Green, Blue) onto their respective SLMs (e.g., DMD chips, LCD panels) simultaneously.

FIG. 6 is a conceptual block diagram of DLP projection system 600 that uses a relay lens system with rotatable anamorphic lenses, according to an embodiment. System 600 is for one color only. Those with ordinary skill in the art would recognize that the DLP projection system can be applied to 3 colors by using a color wheel or Total Internal Reflection (TIR) prism to split the light into primary colors and individual DLD chips for each color. The relay lens system can include separate lens assemblies for each color or three separate relay lens systems can be used to change the format and correct for image distortion.

System 600 includes light source 601, optical integrator 602, relay lens system 603, spatial light modulator 604, projection lens or lens group 605, lens controller 607, processor 608 and memory 609. The dotted arrows in FIG. 6 represent the optical path. Note that FIG. 6 is simplified for clarity and a practical DLP projection system would include other components, such as a light reflector, mirrors (e.g., folding mirrors, dichroic mirrors, front-surfaced mirror) and/or lenses (e.g., focusing lens, shaping lens, collimating lens, condenser lens) and/or apertures (e.g., vignetting aperture) to direct and/or focus the light rays, diffractive beam shapers, light sink, and a color wheel or prism assembly (e.g., TIR prism) for processing the optical paths of the three primary colors (Red Green Blue).

In this example embodiment shown, light source 601 illuminates optical integrator 602. In an embodiment, optical integrator 602 is a solid or hollow rectangular integrator rod. Light source 601 can be a high-pressure xenon arc lamp unit, LEDs or lasers. Optical integrator 602 outputs a uniform rectangular pattern, which is imaged onto spatial light modulator 604 by relay lens system 603 and then projected to an image plane 606 (e.g., a theatre screen) by projection lens 605. In an embodiment, spatial light modulator 604 is a DMD, liquid crystal display (LCD) or Liquid Crystal on Silicon (LCoS).

Relay lens system 604 includes two or more rotatable, anamorphic lenses as described in reference to FIGS. 2 and 3. In an embodiment, the anamorphic lenses are cylindrical. In an embodiment, relay lens system 603 includes a lens barrel for housing the anamorphic lenses and optionally other illumination optics. The anamorphic lenses are mounted in the barrel on bearings or other suitable mechanical devices to facilitate rotation of the lenses in two different orientations, as described in reference to FIGS. 2 and 3. In an embodiment, the rotation of the anamorphic lenses is controlled by lens controller 607 which is controlled by processor 608. In an embodiment, processor 608 also controls the operation of spatial light modulator 604 based on software or firmware instructions stored in memory 609. In other embodiments, a separate processor is used for controlling the operation of spatial light modulator 604 than is used for controlling rotation of the anamorphic lenses in relay lens system 603.

In operation, a projectionist can use an input device (e.g., a computer graphical user interface) to change formats and to set the angular positions of the anamorphic lenses to remove distortion. The inputs provided by the projectionist are processed by processor 608, which commands lens controller 607 to send control signals to relay lens system 603 to rotate the anamorphic lenses. In an embodiment, relay lens system 603 includes a rotary actuator coupled to a lens holder for holding the anamorphic lens in the optical path and one or more feedback sensors (e.g., angular rate sensor) for providing closed-loop feedback to lens controller 607. Lens controller 607 can be a processor that executes software or firmware instructions or an Application-specific Integrated Circuit (ASIC). Lens controller 607 can implement a state machine and/or a suitable control algorithm to control the rotation of the lenses in a stable manner. In an alternative embodiment, the anamorphic lenses are rotated manually by the user using a hardware mechanism (e.g., a lever) attached to the relay lens system 603.

Figure 7:
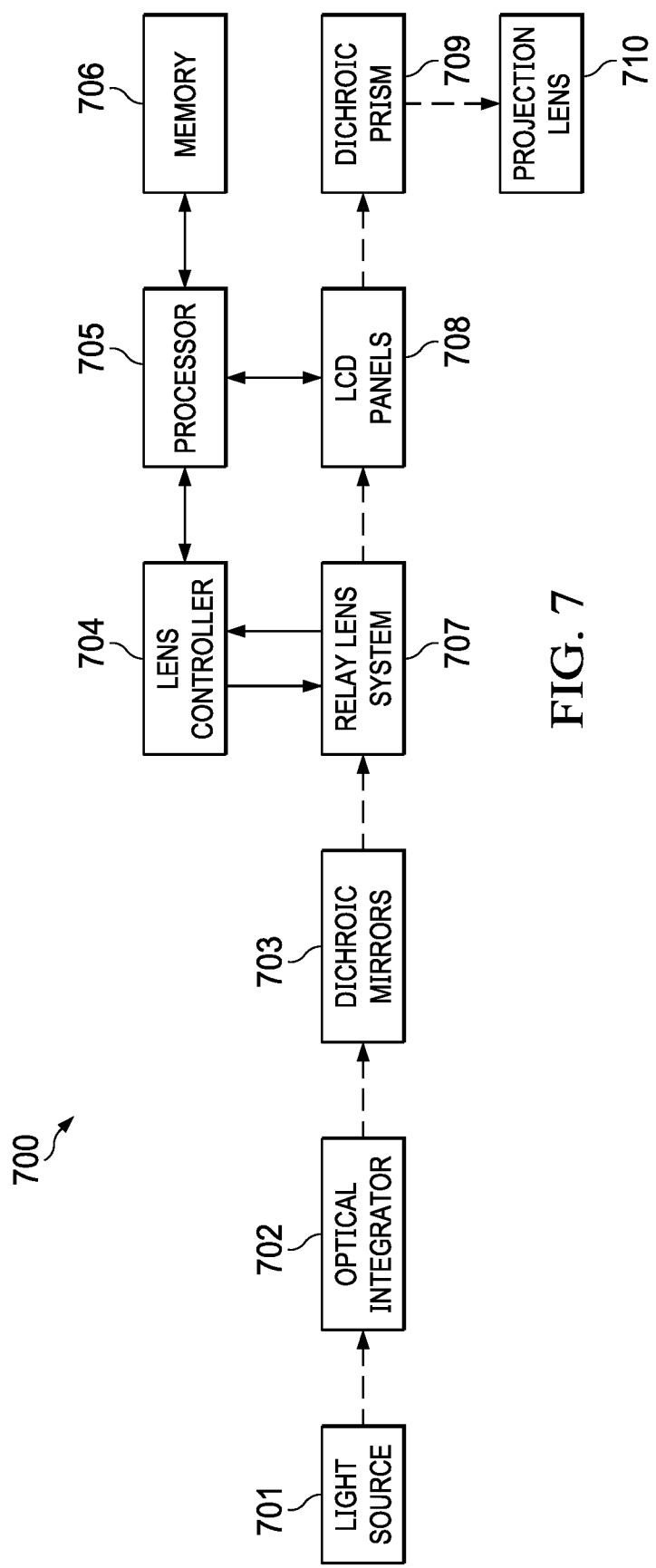
FIG. 7 is a conceptual block diagram of an LCD projection system that uses a relay lens system with rotatable anamorphic lenses, according to an embodiment.

FIG. 7 is a conceptual block diagram of an LCD projection system 700 that uses a relay lens system with rotatable anamorphic lenses, according to an embodiment.

Light source 701 emits a beam of intense white light that is passed through optical integrator 702 (e.g., a fly's eye integrator) which homogenizes the light. The homogenized light is passed to dichroic mirrors 703 that are coated with a film that are designed to reflect only a specific wavelength of color, resulting in red, green and blue light beams. In some LCD projection systems, the white light and dichroic mirrors are replaced by red, blue and green LEDs. The red, green and blue light beams are passed through relay lens system 707. The output of relay lens system 707 is input into transmissive LCD panels 708 composed of tiny pixels that either block or allow light to pass when triggered by an electric current. The red, green and blue tinted images output by transmissive LCD panels 708 are recombined in dichroic prism 709 to form a single image composed of millions of colors. The single image is then projected by projection lens 710 onto a screen.

Relay lens system 707 includes two or more rotatable, anamorphic lens as described in reference to FIGS. 2 and 3. In an embodiment, the anamorphic lenses are cylindrical. In an embodiment, relay lens system 707 includes a lens barrel for housing the anamorphic lenses and optionally other illumination optics. The anamorphic lenses are mounted in the barrel on bearings or other suitable mechanical devices to facilitate rotation of the lenses in two different orientations, as described in reference to FIGS. 2 and 3. In an embodiment, the rotation of the anamorphic lenses is controlled by lens controller 704 which is controlled by processor 705. In an embodiment, processor 705 also controls the operation of transmissive LCD panels 708 based on software or firmware instructions stored in memory 706. In other embodiments, a separate processor is used for controlling the operation of transmissive LCD panels 708 than is used for controlling rotation of the anamorphic lenses in relay lens system 707.

In operation, a projectionist can use an input device (e.g., a computer graphical user interface) to change formats and to set the angular positions of the anamorphic lenses to remove distortion. The inputs provided by the projectionist are processed by processor 705, which commands lens controller 704 to send control signals to relay lens system 707 to rotate the anamorphic lenses. In an embodiment, relay lens system 707 includes a rotary actuator coupled to a lens holder for holding the anamorphic lens in the optical path and one or more feedback sensors (e.g., angular rate sensor) for providing closed-loop feedback to lens controller 704. Lens controller 704 can be a processor that executes software or firmware instructions or an Application-specific Integrated Circuit (ASIC). Lens controller 704 can implement a state machine and/or a suitable control algorithm to control the rotation of the lenses in a stable manner. In an alternative embodiment, the anamorphic lenses are rotated manually by the user using a hardware mechanism (e.g., a lever) attached to the relay lens system 707.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various aspects of the present invention may be appreciated from the following enumerated example embodiments (EEEs):

EEE1. An optical projection system comprising:
  a light source;
  an optical integrator configured to receive light from the light source and to distribute a uniform pattern of light;
  a relay lens system including two or more rotatable anamorphic lenses, the anamorphic lenses oriented about an optical axis to simultaneously transform the uniform pattern of light into an image having a specified aspect ratio and to pre-distort the image;
  at least one spatial light modulator configured to receive the pre-distorted image and to direct a spatially modulated image along an optical path; and
  at least one projection lens configured to receive the spatially modulated image from the optical path and to project the spatially modulated image onto an image plane with the specified aspect ratio.

EEE2. The system of claim 1, wherein the light source is one or more lasers.

EEE3. The system of any of the preceding claim 1 or 2, wherein the optical integrator is a rectangular integrator rod and the corrected image has a substantially rectangular shape.

EEE4. The system of any of the preceding claims 1-3, wherein the optical integrator has an aspect ratio of about 2.08:1, the anamorphic lenses have a compression ratio of about 1.13:1, and the pre-distorted image received by the spatial light modulator has an aspect ratio of about 1.85:1 or about 2.35:1.

EEE5. The system of any of the preceding claims 1-4, wherein the anamorphic lenses are configured to be rotated together to a first angular position to stretch the image vertically, and then rotated together to a second angular position to stretch the image horizontally.

EEE6. The system of any of the preceding claims 1-5, wherein at least one of the anamorphic lenses has at least one convex surface arranged perpendicular to the optical axis.

EEE7. The system of any of the preceding claims 1-6, wherein at least one of the anamorphic lenses is a cylindrical lens.

EEE8. The system of any of the preceding claims 1-7, further comprising:
  a lens controller for controlling rotation of the one or more of the anamorphic lenses about the optical axis.

EEE9. The system of any of the preceding claims 1-8, further comprising:
  one or more processors that communicate with the lens controller to command the controller to rotate the one or more of the anamorphic lenses about the optical axis, and to control the reflection of the pre-distorted image by the spatial light modulator.

EEE10. The system of any of the preceding claims 1-9, wherein the spatial light modulator is a digital micromirror device (DMD).

EEE11. The system of any of the preceding claims 1-10, wherein the specified aspect ratio is compliant with Digital Cinema Initiatives (DCI) illumination format specifications.

EEE12. An optical projection system comprising:
  a light source;
  an optical integrator configured to receive light from the light source and to distribute a uniform pattern of light;
  a relay lens system including two or more rotatable anamorphic lenses, the anamorphic lenses oriented about an optical axis to transform the uniform pattern of light into an image having a specified aspect ratio;
  at least one spatial light modulator configured to receive the image and direct a spatially modulated image along an optical path; and
  at least one projection lens configured to receive the spatially modulated image from the optical path and to project the spatially modulated image onto an image plane with the specified aspect ratio.

EEE13. The system of claim 12, wherein the anamorphic lenses are configured to be rotated together to a first angular position to stretch the image vertically, and then rotated together to a second angular position to stretch the image horizontally.

EEE14. The system of any of the preceding claims 12-13, wherein the optical integrator is a lens array.

EEE15. The system of any of the preceding claims 12-14, wherein the spatial light modulator is a transmissive liquid crystal display (LCD) panel or liquid crystal on silicon (LCoS).

The invention claimed is:

1. A digital light processing, DLP, projection system comprising:
  a light source;
  a rectangular integrator rod configured to receive light from the light source and to distribute a uniform pattern of light;
  a relay lens system including two or more rotatable anamorphic lenses, the anamorphic lenses oriented about an optical axis to simultaneously transform the uniform pattern of light into an image having a specified aspect ratio and a relative angle of the anamorphic lenses with respect to each other being less than 90 degrees to pre-distort the image;
  at least one spatial light modulator configured to receive the pre-distorted image and to direct a spatially modulated image along an optical path; and
  at least one projection lens configured to receive the spatially modulated image from the optical path and to project the spatially modulated image onto an image plane with the specified aspect ratio.

2. The system of claim 1, wherein the light source is one or more lasers.

3. The system of claim 1, wherein the corrected image has a substantially rectangular shape.

4. The system of claim 1, wherein the optical integrator has an aspect ratio of about 2.08:1, the anamorphic lenses have a compression ratio of about 1.13:1, and the pre-distorted image received by the spatial light modulator has an aspect ratio of about 1.85:1 or about 2.35:1.

5. The system of claim 1, wherein the anamorphic lenses are configured to be rotated together to a first angular position to stretch the image vertically, and then rotated together to a second angular position to stretch the image horizontally.

6. The system of claim 1, wherein at least one of the anamorphic lenses has at least one convex surface arranged perpendicular to the optical axis.

7. The system of claim 1, wherein at least one of the anamorphic lenses is a cylindrical lens.

8. The system of claim 7, wherein the two or more anamorphic lenses are cylindrical lenses and an anamorphic ratio, AR, of the anamorphic lenses satisfies the conditions: $AR > 1/\cos(\theta)$, where $\theta$ is an illumination angle of the spatial light modulator, nominally 24 degrees.

9. The system of claim 1, further comprising:
a lens controller for controlling rotation of the two or more of the anamorphic lenses about the optical axis.

10. The system claim 9, further comprising:
one or more processors that communicate with the lens controller to command the controller to rotate the two or more of the anamorphic lenses about the optical axis, and to control the reflection of the pre-distorted image by the spatial light modulator.

11. The system of claim 1, wherein the spatial light modulator is a digital micro-mirror device (DMD).

12. The system of claim 1, wherein the specified aspect ratio is compliant with Digital Cinema Initiatives (DCI) illumination format specifications.

13. The system of claim 1, wherein the optical integrator has an aspect ratio of approximately 2.08:1.

14. The system of claim 1, wherein the anamorphic lenses have a compression ratio of approximately 1.13:1.

15. The system of claim 1, wherein the pre-distorted image received by the spatial light modulator has an aspect ratio of approximately 1.85:1 or approximately 2.35:1.

16. The system of claim 7, wherein the two or more anamorphic lenses are cylindrical lenses.

17. The system of claim 1, wherein an anamorphic ratio, AR, of the anamorphic lenses satisfies the conditions: AR>1/cos(θ), where θ is an illumination angle of the spatial light modulator, nominally 24 degrees.

18. A liquid-crystal display, LCD; projection system comprising:
a light source;
a lens array configured to receive light from the light source and to distribute a uniform pattern of light;
a relay lens system including two or more rotatable anamorphic lenses, the anamorphic lenses oriented about an optical axis to transform the uniform pattern of light into an image having a specified aspect ratio, wherein the anamorphic lenses have a compression ratio of about 1.13:1;
at least one spatial light modulator configured to receive the image and direct a spatially modulated image along an optical path; and
at least one projection lens configured to receive the spatially modulated image from the optical path and to project the spatially modulated image onto an image plane with the specified aspect ratio.

19. The system of claim 18, wherein the anamorphic lenses are configured to be rotated together to a first angular position to stretch the image vertically, and then rotated together to a second angular position to stretch the image horizontally.

20. The system of claim 18, wherein the spatial light modulator is a transmissive liquid crystal display (LCD) panel or liquid crystal on silicon (LCoS).

* * * * *